United States Patent
Totale et al.

(10) Patent No.: US 10,466,872 B1
(45) Date of Patent: Nov. 5, 2019

(54) COMPOSABLE EVENTS FOR DYNAMIC USER INTERFACE COMPOSITION

(71) Applicant: Open Text Corporation, Waterloo (CA)

(72) Inventors: Sachin G. Totale, Bangalore (IN); Marwan Suliman, Dublin, CA (US); Naveen Vidyananda, Bangalore (IN); Roshan Prakash Salvi, Bangalore (IN); Mohamed Taj, Bangalore (IN)

(73) Assignee: Open Text Corporation, Waterloo (CA)

( * ) Notice: Subject to any disclaimer, the term of this patent is extended or adjusted under 35 U.S.C. 154(b) by 54 days.

(21) Appl. No.: 14/136,232

(22) Filed: Dec. 20, 2013

(51) Int. Cl.
*G06F 3/0484* (2013.01)
*G06F 17/24* (2006.01)

(52) U.S. Cl.
CPC .......... *G06F 3/0484* (2013.01); *G06F 17/248* (2013.01)

(58) Field of Classification Search
None
See application file for complete search history.

(56) References Cited

U.S. PATENT DOCUMENTS

| | | | |
|---|---|---|---|
| 4,910,660 A | 3/1990 | Li | |
| 5,079,690 A | 1/1992 | Li | |
| 5,644,738 A | 7/1997 | Goldman et al. | |
| 5,754,772 A * | 5/1998 | Leaf | H04L 29/06 707/999.01 |
| 6,012,067 A * | 1/2000 | Sarkar | G06F 17/30861 |
| 6,226,627 B1 | 5/2001 | Polak | |
| 6,233,726 B1 * | 5/2001 | Bowman | G06F 8/20 707/999.102 |
| 6,304,886 B1 * | 10/2001 | Bernardo | G06F 17/211 707/E17.112 |
| 6,397,220 B1 | 5/2002 | Deisinger | |
| 6,724,403 B1 * | 4/2004 | Santoro | G09G 5/14 715/765 |
| 7,013,469 B2 * | 3/2006 | Smith | G06F 9/465 719/315 |
| 7,225,425 B2 | 5/2007 | Kompalli et al. | |
| 7,734,995 B1 * | 6/2010 | Saikaly | G06F 17/248 715/200 |
| 7,797,432 B2 | 9/2010 | Volodarsky et al. | |
| 7,933,632 B2 * | 4/2011 | Flynt | G06F 3/0481 340/995.1 |
| 8,156,481 B1 | 4/2012 | Koh et al. | |

(Continued)

OTHER PUBLICATIONS

The PHP Group, What is PHP?, Jan. 23, 2009.

(Continued)

*Primary Examiner* — Beau D Spratt
(74) *Attorney, Agent, or Firm* — Sprinkle IP Law Group (57) ABSTRACT

Composable events to provide a dynamic user interface are disclosed. In various embodiments, a definition of a custom user interface event is received. The definition includes an identification of a data value to be associated with the event, a scope of the event within which the event will be consumed, and an event trigger in response to which an instance of the custom user interface event is to be published. Application user interface code configured to provide one or more application user interface elements configured to publish or subscribe to the custom user interface event is generated programmatically, based at least in part on the definition.

19 Claims, 6 Drawing Sheets

(56) References Cited

U.S. PATENT DOCUMENTS

| | | |
|---|---|---|
| 8,271,899 B1 | 9/2012 | Blackburn et al. |
| 8,321,681 B2 | 11/2012 | Tulchinsky et al. |
| 8,346,889 B1 | 1/2013 | Chiu et al. |
| 8,560,959 B2* | 10/2013 | Zaman .................... G06F 3/048 715/234 |
| 8,572,268 B2 | 10/2013 | Wray |
| 8,645,848 B2 | 2/2014 | Lesh |
| 9,170,786 B1 | 10/2015 | Totale |
| 9,756,147 B1 | 9/2017 | Totale |
| 9,977,703 B2* | 5/2018 | Gall ....................... G06F 9/542 |
| 2002/0194393 A1 | 12/2002 | Hrischuk et al. |
| 2003/0004770 A1 | 1/2003 | Miller et al. |
| 2003/0023641 A1 | 1/2003 | Gorman et al. |
| 2003/0222906 A1 | 12/2003 | Fish et al. |
| 2004/0006765 A1* | 1/2004 | Goldman ................ G06F 8/315 717/116 |
| 2004/0044987 A1 | 3/2004 | Kompalli et al. |
| 2005/0022157 A1* | 1/2005 | Brendle .................. G06F 9/485 717/104 |
| 2005/0114849 A1 | 5/2005 | Megiddo |
| 2005/0149908 A1 | 7/2005 | Klianev |
| 2005/0166207 A1 | 7/2005 | Baba et al. |
| 2006/0053421 A1 | 3/2006 | Dickenson |
| 2006/0074704 A1 | 4/2006 | Shukla et al. |
| 2006/0074733 A1 | 4/2006 | Shukla et al. |
| 2006/0236304 A1 | 10/2006 | Luo et al. |
| 2006/0236306 A1 | 10/2006 | Debruin et al. |
| 2006/0259586 A1* | 11/2006 | Wood .................... G06F 16/954 709/219 |
| 2007/0055591 A1 | 3/2007 | Enenkiel |
| 2007/0266368 A1 | 11/2007 | Szpak et al. |
| 2008/0046868 A1* | 2/2008 | Tsantilis .................... G06F 8/36 717/136 |
| 2008/0281944 A1 | 11/2008 | Vorne et al. |
| 2009/0019386 A1* | 1/2009 | Sweetland ............. G06F 17/248 715/765 |
| 2009/0055725 A1* | 2/2009 | Portnov .................. G06Q 30/02 715/234 |
| 2009/0193339 A1 | 7/2009 | Nichols |
| 2009/0210631 A1 | 8/2009 | Bosworth et al. |
| 2009/0307670 A1 | 12/2009 | Kashyap et al. |
| 2010/0211420 A1 | 8/2010 | Kodi et al. |
| 2010/0281462 A1 | 11/2010 | Festa |
| 2010/0293056 A1* | 11/2010 | Flynt ..................... G06F 3/0481 705/14.58 |
| 2011/0225565 A1 | 9/2011 | Van Velzen et al. |
| 2011/0246549 A1 | 10/2011 | Katzenberger et al. |
| 2012/0131442 A1* | 5/2012 | Grizim .................... G06F 17/24 715/234 |
| 2012/0166992 A1 | 6/2012 | Huynh et al. |
| 2013/0019172 A1 | 1/2013 | Kotler et al. |
| 2013/0019182 A1 | 1/2013 | Gil et al. |
| 2013/0151571 A1* | 6/2013 | Stumpf ............... G06F 16/2452 707/805 |
| 2013/0205193 A1 | 8/2013 | Matsufuji et al. |
| 2013/0218919 A1* | 8/2013 | Solonchev .......... G06F 17/3089 707/758 |
| 2013/0219263 A1* | 8/2013 | Abrahami ............. G06F 17/211 715/234 |
| 2013/0290380 A1* | 10/2013 | Flickner ............. H04N 21/4332 707/803 |
| 2014/0013297 A1* | 1/2014 | Cook ........................ G06F 8/33 717/105 |
| 2014/0201232 A1* | 7/2014 | Berry ................ G06F 17/30899 707/769 |
| 2014/0245262 A1* | 8/2014 | Hill .......................... G06F 8/70 717/120 |
| 2016/0054986 A1 | 2/2016 | Totale |
| 2017/0359445 A1 | 12/2017 | Totale |

OTHER PUBLICATIONS

Author Unknown, Kohana Team, Session Library, Jan. 2012, retrieved from http://www.hcs.harvard.edu/-powerpak/kohanadocs/libraries/session.html, 6 pages.

Author Unknown, www.gwtproject.org, GWT, Jul. 2013, retrieved from https ://web. archive.org/web/20130708095321 /http://www.gwtproject.org/doc/latest/DevGuideHtml5Storage. html , 7 pages.

Author Unknown, w3schools.com, "HTML5 Web Storage", Nov. 2012, retrieved from https://web.archive.org/web/20121123023047/http://www.w3schools.com/html/html5_webstorage.asp, 3 pages.

Office Action for U.S. Appl. No. 14/136,287, dated Dec. 17, 2014, 10 pgs.

Office Action for U.S. Appl. No. 14/136,255, dated Jan. 15, 2016, 16 pgs.

Office Action for U.S. Appl. No. 14/136,255, dated Apr. 22, 2016, 16 pgs.

Office Action for U.S. Appl. No. 14/136,255, dated Jul. 12, 2016, 23 pgs.

Office Action for U.S. Appl. No. 14/136,255, dated Oct. 17, 2016, 21 pgs.

Office Action for U.S. Appl. No. 14/136,255, dated Feb. 6, 2017, 21 pgs.

Notice of Allowance for U.S. Appl. No. 14/136,255, dated May 26, 2017, 4 pgs.

Office Action for U.S. Appl. No. 15/633,293, dated Feb. 20, 2018, 23 pgs.

Office Action for U.S. Appl. No. 14/842,713, dated Mar. 9, 2018, 43 pgs.

Notice of Allowance for U.S. Appl. No. 14/842,713, dated Oct. 1, 2018, 7 pgs.

Office Action for U.S. Appl. No. 15/633,293, dated Dec. 3, 2018, 19 pgs.

Notice of Allowance for U.S. Appl. No. 14/842,713, dated Jan. 28, 2019, 4 pgs.

Notice of Allowance for U.S. Appl. No. 14/842,713, dated May 7, 2019, 4 pgs.

Office Action for U.S. Appl. No. 15/633,293, dated Mar. 27, 2019, 14 pgs.

Notice of Allowance for U.S. Appl. No. 14/842,713, dated Aug. 15, 2019, 4 pgs.

* cited by examiner

COMPOSABLE EVENTS FOR DYNAMIC USER INTERFACE COMPOSITION

BACKGROUND OF THE INVENTION

Advanced software development tools may enable developers to define user interface elements configured to publish and/or subscribe to user interface events. In typical approaches, the events available to be published and/or subscribed to are defined in advance, and the behavior of user interface elements to publish and/or respond to receipt of user interface events is predefined by a provider of the software development tool.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Composable custom user interface events to facilitate composition of dynamic user interfaces (UI) are disclosed. In various embodiments, a software development tool is provided that enables a developer to define custom user interface events. In various embodiments, a developer defines and/or selects a composable element comprising one or more of user interface elements (e.g., page element) and non-user interface elements (e.g., data service, action flow) with which to associate a custom event. In the case of a user interface element to be configured to publish a custom event, in various embodiments one of more of the following may be received: a definition of the event (e.g., structure, event content or arguments, event scope, e.g., fragment-wide, page-wide, application-wide, etc.); one or more event triggers or other conditions that may cause the user interface element to publish an instance of the event; and one or more conditions to be evaluated at runtime, for example to determine in response to an event trigger whether an instance of the event will be published, a payload or other content associated with the event, etc. In some embodiments, an event payload may be stored temporarily in a "content cache" or other structure, e.g., from which a user interface or other element configured to consume the event may read the payload. In some embodiments, an event is cached until another event of the same type is published. In the case of a user interface or other element to be configured to subscribed to and/or otherwise consume the event, one or more of the following may be received: a definition of an evaluation or other trigger associated with receipt of an instance of the user interface event; and one or more expressions to be evaluated in response to receiving an instance of the event. In some embodiments, the latter expressions may include and/or make reference to data values read from a payload associated with the received user interface event instance. In some embodiments, an event definition may indicate a scope of an event, e.g., fragment-wide, page-wide, application-wide; and the event is published and/or consumed only within the defined scope of the event.

Figure 1:
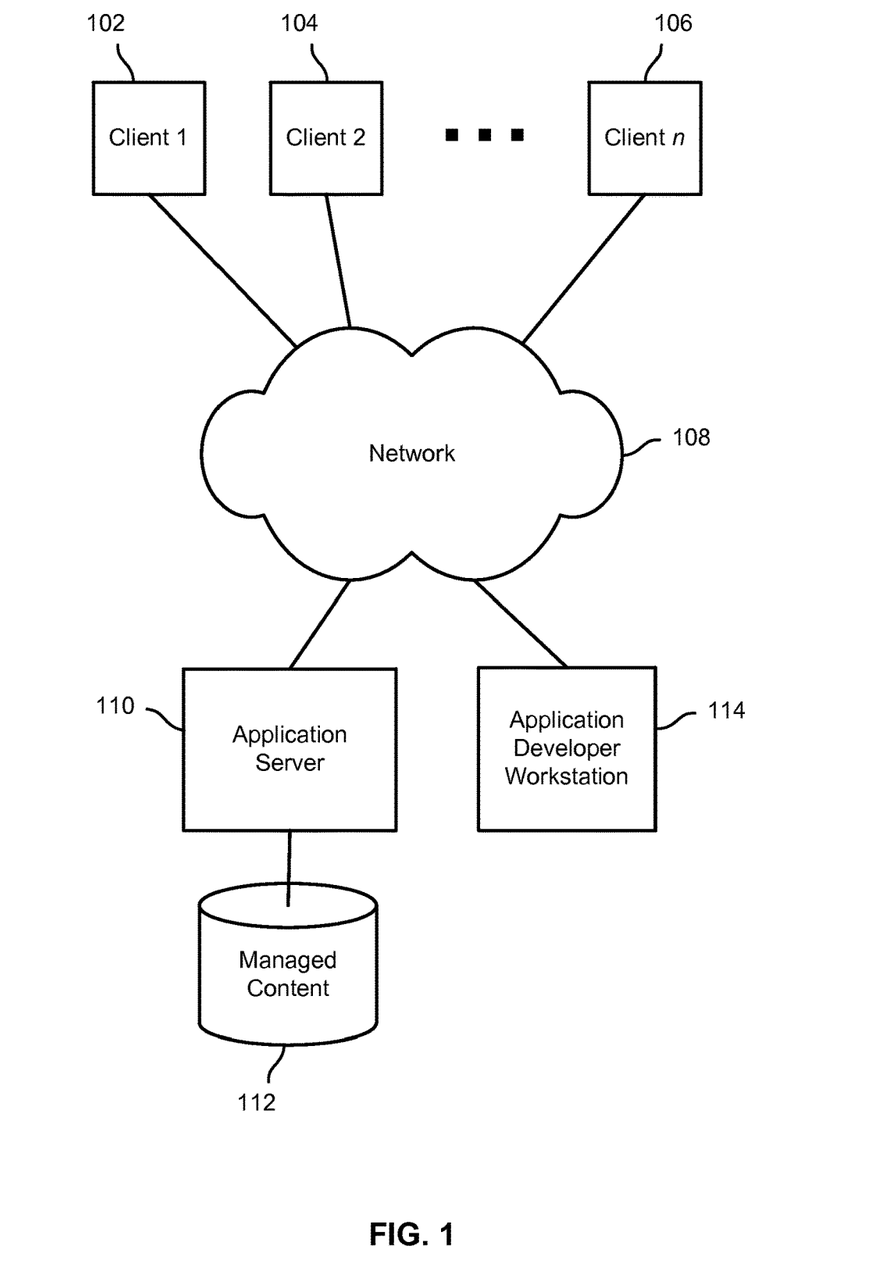
FIG. 1 is a block diagram illustrating an embodiment of an application development system and environment.

FIG. 1 is a block diagram illustrating an embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®.

In various embodiments, a visual or other development tool interface to enable developers to compose developer-composed custom user interface events, and user interface element (e.g., page element) definitions to publish, subscribe to, and consume developer-composed events, is provided, e.g., via application development workstation 114. Definitions are received via the interface and stored. The definitions are used to generate application user interface code which at runtime invokes a user interface event infrastructure, e.g., of a runtime or other environment comprising application server 110, to publish, subscribed to, and/or consume custom user interface events as defined by the developer.

Figure 2:
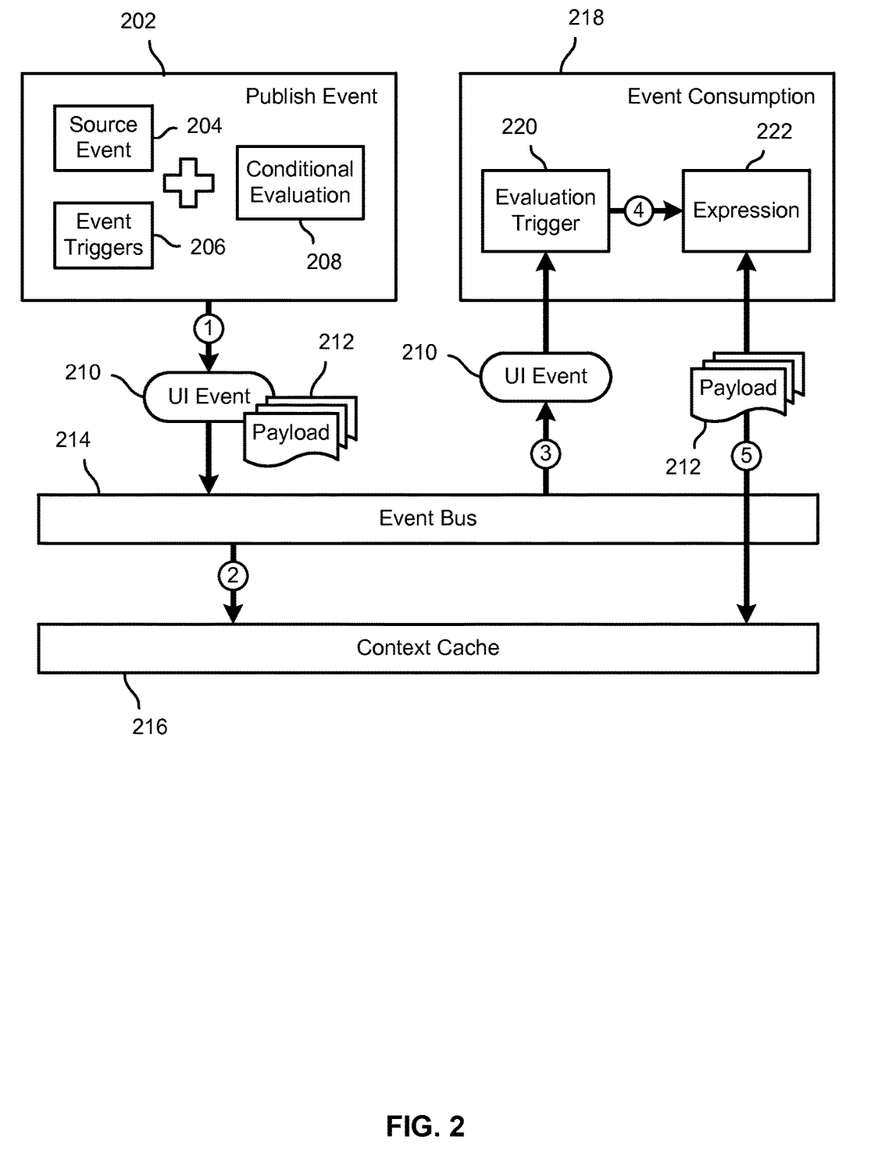
FIG. 2 is a functional block diagram illustrating an embodiment of a system to use developer-composed custom user interface events to provide a dynamic user interface.

FIG. 2 is a functional block diagram illustrating an embodiment of a system to use developer-composed custom user interface events to provide a dynamic user interface. In the example shown, an event publication component 202 comprising an application user interface uses a source event (i.e., event definition) 204 and one or more associated event triggers 206, along with in this example (optional) conditional evaluation 208, e.g., using contextual or other information as defined by the developer, to determine that an instance 210 of a developer-composed user interface event is to be published (see arrow labeled "1" in FIG. 2). In the example shown, the user interface event instance 210 includes and/or is otherwise associated with an event payload 212. Examples of an event payload 212 include, without limitation, a set of parameters or other values to be provided to event consumers.

In the example shown in FIG. 2, the user interface event 210 is transmitted via an event bus 214. A copy of the payload 212 is stored in a context cache 216 (see arrow labeled "2" in FIG. 2). The user interface event instance 210 is provided via event bus 214 to an event consumption component/infrastructure 218 (see arrow labeled "3" in FIG. 2) to be provided to any user interface and/or other elements that may have subscribed to receive events of that event type. An evaluation trigger 220 results in event data associated with event instance 210 being provided to be evaluated using an expression 222 (see arrow labeled "4" in FIG. 2). In the example shown, the expression 222 has been defined by the developer who composed the application user interface, including the custom user interface event of which event instance 210 is an instance in this example, to use data comprising and/or derived as defined by the developer from data included in the payload 212 of event instance 210, e.g., as one or more arguments of the expression(s) 222 defined by the developer to be evaluated at runtime (see arrow labeled "5" in FIG. 2). In this manner, a developer can incorporate highly dynamic behaviors into the application user interface, by loosely coupling user interface elements. For example, an application user interface element (e.g., a page element), may be configured to use application-level data values as determined and included in the event payload 212 at runtime to exhibit more than one different dynamic behaviors depending at least in part on the application data values included in the payload 212 of event instance 210.

In some embodiments, use of a structure such as content cache 216 to store event payloads may enable the developer to use the user interface event infrastructure, such as the one shown in FIG. 2, to temporarily store application user interface data values for consumption and use by application user interface elements, on the current or other application user interface pages, or other application components or elements.

Figure 3:
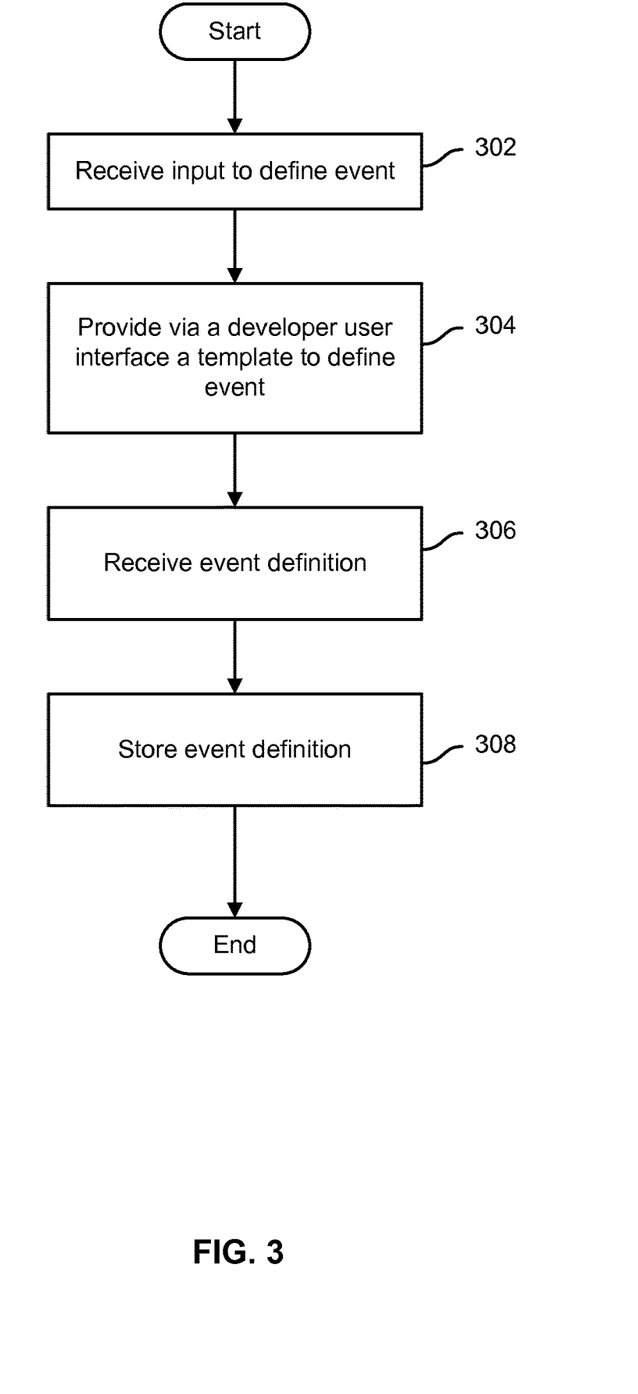
FIG. 3 is a flow chart illustrating an embodiment of a process to compose a custom user interface event.

FIG. 3 is a flow chart illustrating an embodiment of a process to compose a custom user interface event. In the example shown, an input to define a custom user interface event is received (302), e.g., via a visual or other software development tool interface. For example, an indication that a developer has selected a "define custom user interface event" option or control may be received. In response, a template to be used by the developer to define the custom user interface is provided (304). For example, a form or template to receive developer input in a structured manner may be displayed. Custom user interface event definition data is received (306) and stored (308), e.g., for later use to generate programmatically application user interface code to implement the custom user interface event and associated user interface elements and behaviors, as defined by the developer, and/or as an event definition to be used at runtime to create and publish, subscribe to, and/or consume instances of the developer-composed custom user interface event.

Figure 4:
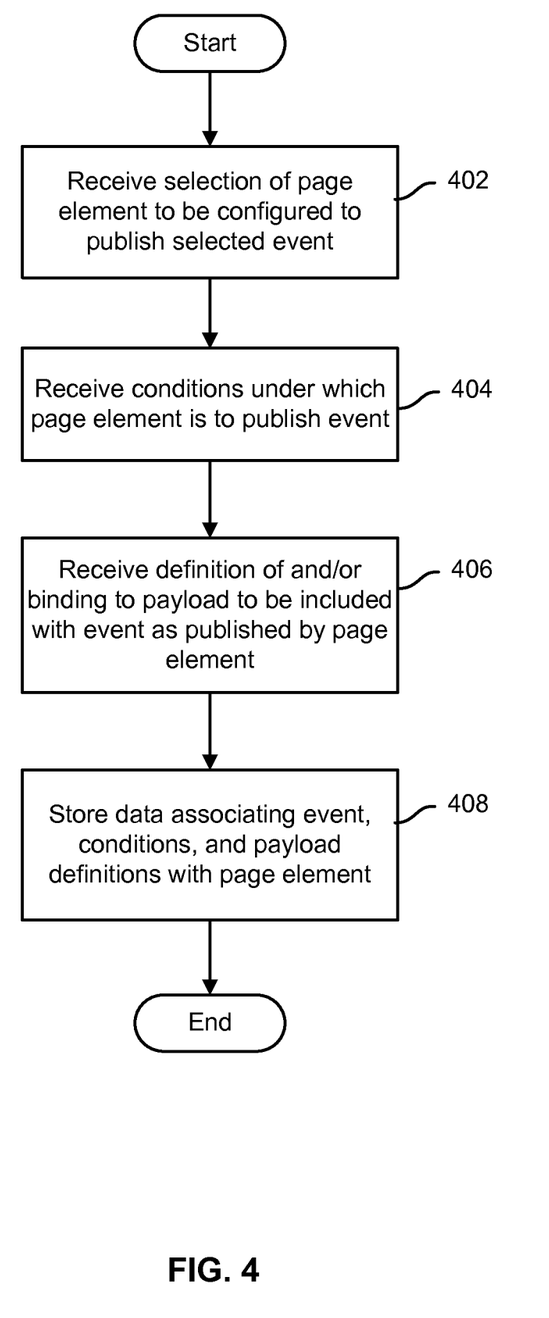
FIG. 4 is a flow chart illustrating an embodiment of a process to associate a custom user interface event with a user interface element to publish the event.

FIG. 4 is a flow chart illustrating an embodiment of a process to associate a custom user interface event with a user interface element to publish the event. In the example shown, a selection of page (or other user interface) element to be configured to publish a selected custom user interface event is received (402), e.g., via a development tool user interface. One or more conditions (e.g., event triggers) under which the page element is to be configured to publish an instance of the selected event is received (404). In various embodiments, a declarative or other form of input is used by a developer to define the event trigger(s) and/or condition(s). A definition (e.g., declarative), selection (e.g., drag/drop, drop down or other menu, etc.), or other indication of a payload to be included with and/or otherwise associated with instances of the selected event as published by the selected page element is received (406). Data associating the selected event, conditions (e.g., trigger), and payload definitions with the page (or other) element are stored (408), e.g., to be used at application user interface code generation time to generate programmatically code to provide and configure the application user interface page element to publish instances of the selected event, upon occurrence of the developer-defined event trigger (or other condition), with the payload as indicated and defined by the developer.

Figure 5:
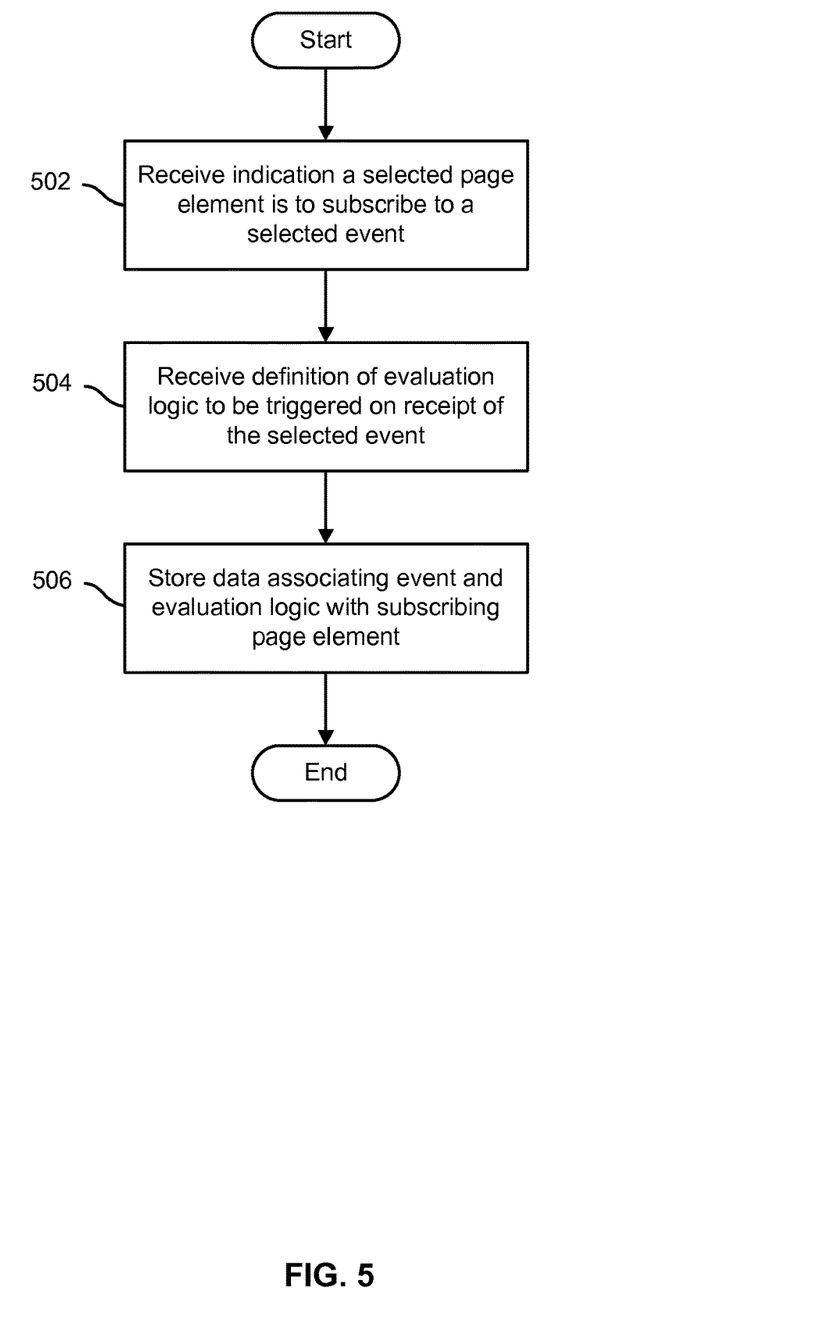
FIG. 5 is a flow chart illustrating an embodiment of a process to define a user interface element to subscribe to and consume a custom user interface event.

FIG. 5 is a flow chart illustrating an embodiment of a process to define a user interface element to subscribe to and consume a custom user interface event. In the example shown, an indication is received that a selected page (or other) element is to subscribe to a selected developer-composed custom user interface event (502). A definition is received of one or more expressions and/or other evaluation logic to be used by and/or on behalf of the subscribing user interface element at runtime to determine a responsive action, if any, to be performed in response to a received instance of the selected event (504). Data associating the selected event and evaluation logic (e.g., expressions) with the subscribing page (or other) element is stored (506).

Figure 6:
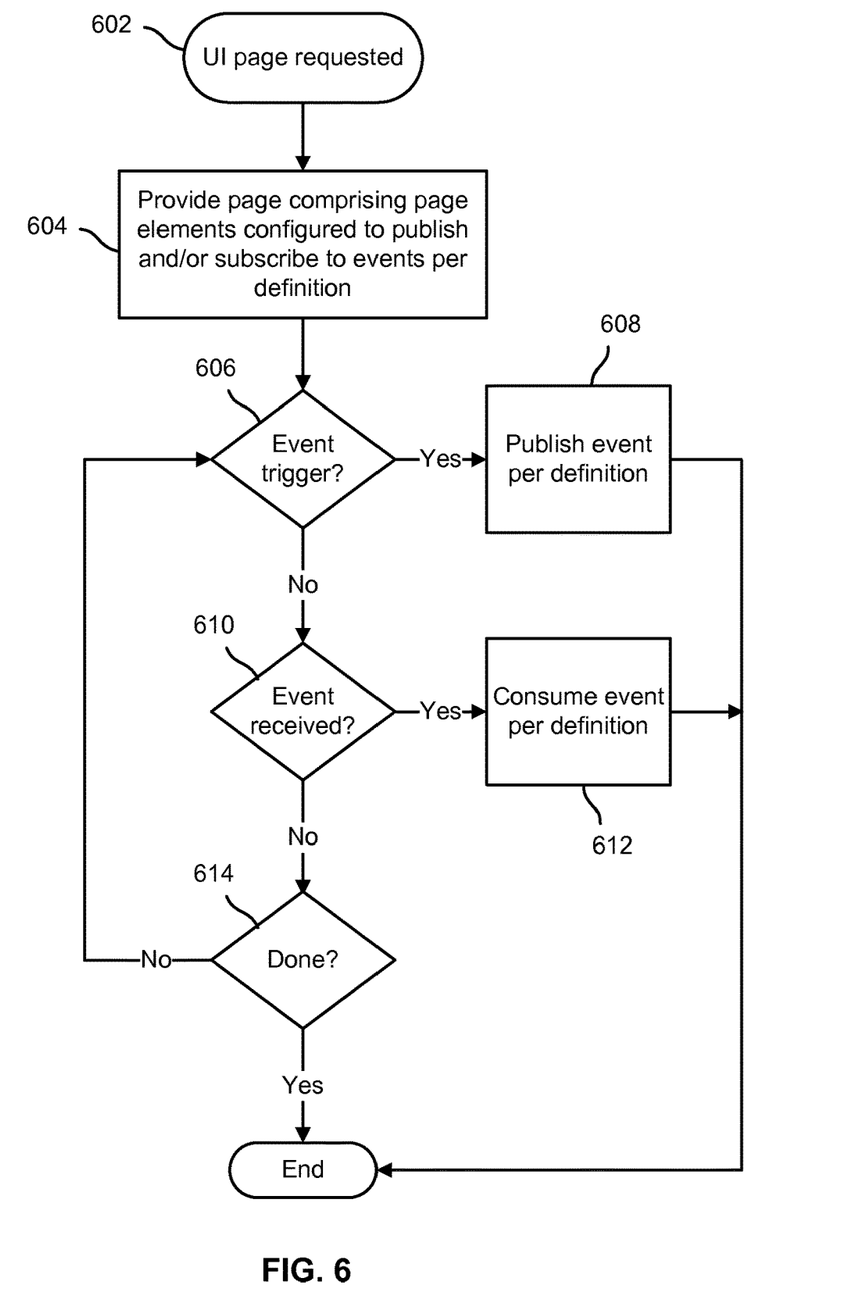
FIG. 6 is a flow chart illustrating an embodiment of a process to provide an application user interface.

FIG. 6 is a flow chart illustrating an embodiment of a process to provide an application user interface. In the example shown, an application user interface page is requested (602), e.g., the application is launched, accessed using a web browser, and/or a user or other input received in the context of a previously-provided user interface page causes a the currently-request page to be requested. An application user interface page comprising page elements configured to publish and/or subscribe to and consume developer-composed custom user interface elements, as disclosed herein, is provided (604). Upon occurrence of a developer-defined event trigger (606), an instance of a developer-composed (or other) application user interface event is published (608). In various embodiments, the user interface event may be published conditionally, based for example on conditions defined declaratively or otherwise by the developer, and/or to include a payload comprising data values as defined by the developer. If a user interface event a page element is configured to subscribe to is received (610), the event is consumed by the subscribing page element as defined by the developer (612). In various embodiments, a developer-defined expression or other logic may be evaluated to determine a dynamic behavior, if any, to be provided by the subscribing user interface element in response to receipt of the event. In some embodiments, a developer-defined expression or other logic may use one or more data values comprising and/or derived from a payload associated with the received user interface event instance, e.g., as described above. The process of FIG. 6 continues, e.g., potentially with subsequent user interface events being published and/or received and consumed as disclosed herein, until done (614), e.g., a different application user interface page is requested and/or loaded, or the user discontinues use of the application.

Using techniques disclosed herein, a highly dynamic and flexible application user interface can be defined, without constraining a developer to use of only a predefined set of application user interface events, triggers, and/or responses.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a user interface, comprising:
   prior to a runtime of an application, receiving an indication of a selection associated with a custom user interface event;
   in response to the indication, providing a template to assist defining the custom user interface event in a structured manner;
   prior to the runtime of the application, receiving at least in part via the template a definition of the custom user interface event, the definition including an identification of a data value to be associated with the custom user interface event, an indication of a scope of the custom user interface event, wherein the custom user interface event is consumed only within the indicated scope by other page elements outside of a first application user interface element selected to publish the custom user interface event, and one or more event triggers in response to which an instance of the custom user interface event is to be published;
   prior to the runtime of the application, receiving an indication of the first application user interface element to publish the custom user interface event and associating the first application user interface element with the custom user interface event; and
   generating programmatically, based at least in part on the definition, an application user interface code configured to provide, during the runtime of the application, an application user interface page to a client, the application user interface page comprising one or more application user interface elements including the first application user interface element, wherein the first application user interface element is configured to publish, upon occurrence of at least one of the one or more event triggers, for consumption by one or more elements of the application user interface page within the scope, the instance of the custom user interface event with an associated data value according to the identification of the data value and wherein the application user interface code is configured to cause the associated data value to be stored in a content cache from which the data value is read by the one or more elements of the application user interface page within the scope until another instance of the custom user interface event is published.

2. The method of claim 1, wherein the definition is received via a software development tool interface.

3. The method of claim 1, wherein the identification of the data value comprises an indication of a payload to be associated with the custom user interface event.

4. The method of claim 3, wherein the payload comprises a set of one or more parameters.

5. The method of claim 3, wherein the associated data value is stored in a structure associated with an event bus via which the instance of the custom user interface event is published.

6. The method of claim 1, further comprising receiving a definition of the first application user interface element configured to publish the custom user interface event.

7. The method of claim 1, further comprising, receiving a definition of a second application user interface element of the one or more application user interface elements, the second application user interface element configured to subscribe to the custom user interface event.

8. The method of claim 1, further receiving an expression to be evaluated in connection with consumption of the custom user interface event.

9. The method of claim 8, wherein the expression includes the associated data value as an argument.

10. The method of claim 9, wherein the associated data value is included in a payload associated with the instance of the custom user interface event.

11. The method of claim 10, wherein at least one application user interface element is configured to use the expression to consume the instance of the custom user interface event and to perform a dynamic user interface action determined based at least in part on a result of evaluation of the expression.

12. The method of claim 1, wherein the scope is fragment-wide, page-wide, or application-wide.

13. A system, comprising:
   a data storage device; and
   a processor coupled to the data storage device and configured to:
      prior to a runtime of an application, receive an indication of a selection associated with a custom user interface event;
      in response to the indication, provide a template to assist defining the custom user interface event in a structured manner;
      prior to the runtime of the application, receive, at least in part via the template and store in the data storage device, a definition of the custom user interface event, the definition including an identification of a data value to be associated with the custom user interface event, an indication of a scope of the custom user interface event, wherein the custom user interface event is consumed only within the indicated scope by page elements outside of a first application user interface element selected to publish the custom user interface event, and one or more event triggers in response to which an instance of the custom user interface event is to be published;
      prior to the runtime of the application, receive an indication of the first application user interface element to publish the custom user interface event and associate the first application user interface element with the custom user interface event; and generate programmatically, based at least in part on the definition, an application user interface code configured to provide, during the runtime of the application, an application user interface page to a client, the application user interface page comprising one or more application user interface elements, wherein the one or more application user interface elements include the first application user interface element configured to publish, upon occurrence of at least one of the one or more event triggers, for consumption by one or more elements of the application user interface page within the scope, the instance of the custom user interface event with an associated data value according to the identification of the data value, wherein the application user interface code is configured to cause the associated data value to be stored in a content cache from which the data value is read by the one or more elements of the application user interface page within the scope until another instance of the custom user interface event is to be published.

14. The system of claim 13, wherein the data storage device comprises a memory.

15. The system of claim 13, wherein the identification of the data value comprises an indication of a payload to be associated with the custom user interface event.

16. The system of claim 15, wherein the application user interface code is configured to store the associated data value in a structure associated with an event bus via which the instance of the custom user interface event is published.

17. The system of claim 13, wherein the processor is further configured to receive a definition of the first application user interface element configured to publish the custom user interface event.

18. The system of claim 13, wherein the scope is fragment-wide, page-wide, or application-wide.

19. A computer program product to provide a user interface, the computer program product being embodied in a non-transitory computer-readable storage medium and comprising computer instructions for:

prior to a runtime of an application, receiving an indication of a selection associated with a custom user interface event;

in response to the indication, providing a template to assist defining the custom user interface event in a structured manner;

prior to the runtime of the application, receiving at least in part via the template a definition of the custom user interface event, the definition including an identification of a data value to be associated with the custom user interface event, an indication of a scope of the custom user interface event, wherein which the custom user interface event is consumed only within the indicated scope by page elements outside of a first application user interface element selected to publish the custom user interface event, and one or more event triggers in response to which an instance of the custom user interface event is to be published;

prior to the runtime of the application, receiving a selection of the first application user interface element to publish the custom user interface event and associating the first application user interface element with the custom user interface event; and generating programmatically, based at least in part on the definition, an application user interface code configured to provide, during the runtime of the application, an application user interface page to a client, the application user interface page comprising one or more application user interface elements, wherein the one or more application user interface elements include the first application user interface element configured to publish, upon occurrence of at least one of the one or more event triggers, for consumption by one or more elements of the application user interface page within the scope, the instance of the custom user interface event with an associated data value according to the indication of the data value, wherein the application user interface code is configured to cause the associated to be stored in a content cache from which the data value is read by the one or more elements of the application user interface page within the scope until another instance of the custom user interface event is to be published.

* * * * *